United States Patent Office 3,261,874
Patented July 19, 1966

3,261,874
PREPARATION AND POLYMERIZATION OF
1,4-PENTADIENE MONOXIDE
Eugene L. Stogryn, Fords, and Anthony J. Passannante,
Metuchen, N.J., assignors to Esso Research and Engineering Company, a corporation of Delaware
No Drawing. Filed Aug. 22, 1962, Ser. No. 219,369
2 Claims. (Cl. 260—615)

This invention relates to a new unsaturated epoxide, its preparation, and polymerization to new and useful products. In particular, the unsaturated epoxy prepared and polymerized as herein disclosed is the monoxide of 1,4-pentadiene.

The unsaturated epoxide, 1,3-butadiene monoxide, has been described in the literature. This butadiene monoxide has been polymerized to low molecular weight oils and to very high molecular weight polymers. However, for certain applications, the low molecular weight polymers of the butadiene monoxide suffers from certain drawbacks. When the butadiene monoxide is treated with an epoxide polymerization catalyst, polymerization does not occur exclusively through the epoxide ring which is formed by oxygen linked to two carbon atoms in the chain of carbon atoms. Accordingly, the olefinic group in the butadiene monoxide participates in the propagation of the polymer to a substantial amount, such as about 12%, so that the polymer formed has fewer than the theoretical number of double bonds available for post-polymerization modifications. For example, if the post-polymerization reaction is a halogenation, less than one mole of halogen per monomer unit can be added to the polymer.

Unlike 1,3-butadiene monoxide, the compound 1,4-pentadiene monoxide has the epoxy ring separated from the closest double bond carbon atom in the molecule by a methylene group, as shown in the following structural formula of 1,4-pentadiene monoxide:

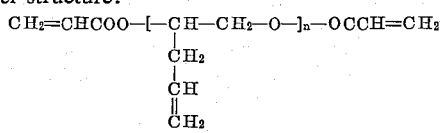

Unlike the polymerization of 1,3-butadiene monoxide, the polymerization of 1,4-pentadiene monoxide takes place through the epoxy ring without olefin group participation. Thus, by using the 1,4-pentadiene monoxide monomer for polymerization, the number of olefin groups available for post-polymerization modification is one olefin group per recurring monomeric unit in the polymer represented by the following general structure:

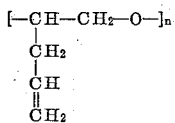

The low molecular weight polymers of 1,4-pentadiene monoxide, which are readily made using epoxide polymerization catalysts, are liquids having molecular weights in the range of about 250 to 3000. These polymers, in general, have terminal hydroxyl groups. In forming these polymers, modifying reactants may be used to increase the desired terminal functional groups. These polymers and their modifications are useful in chain extending polymerizations, such as encountered by reaction with diisocyanates to form polyurethanes, or reaction with diacyl halides or diacids to form polyesters. The desired reaction of a reactant with the pendant double bonds can be performed on the liquid polymers before or after further modifications or polymerization.

The unsaturated polyethers of 1,4-pentadiene monoxide made to contain OH groups can be acrylated to form acrylates which undergo further polymerization to polymers useful as bonding agents, textile sizes, and coatings. The acrylate polymers are represented by a linear polymer structure:

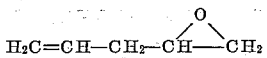

wherein the recurring unit has the terminal OH groups replaced by the acrylate groups, $CH_2=CHCOO-$, through which such polymers may undergo crosslinking to form three-dimensional polymers.

A satisfactory method found for preparing the 1,4-pentadiene monoxide monomer comprises reacting 4-hydroxy 5-chloro pentene-1 in aqueous suspension with caustic under ordinary conditions of temperature and pressure, then recovering the organic product by separation from water and distillation. Two methods for preparing the reactant, 4-hydroxy 5-chloro pentene-1, have been used, as described in the following examples.

EXAMPLE 1

*Preparation of 4-hydroxy 5-chloro pentene-1*

(a) 1,4-pentadiene, 100 g., was suspended in 600 ml. of water containing 0.5 teaspoons of a surfactant and cooled to 0° C. Carbon dioxide was bubbled through the rapidly stirred suspension. Calcium hypochlorite, 68 g. in 1 l. of $H_2O$ was added over a period of 5 hours. After the addition was complete, $CO_2$ introduction was continued until the aqueous phase failed to oxidize KI solution. After the solids were removed, the aqueous phase was saturated with NaCl and extracted with ether. The ether solution was dried and distilled. In this manner, there was obtained 9.1 g. of 4-hydroxy 5-chloro pentene-1, boiling point 52–59° C./7.5 mm. Hg.

(b) Epichlorohydrin, 152 g., in 400 ml. of anhydrous tetrahydrofuran was placed in a reactor and cooled to 0° C. To this solution was added 333 ml. of 3 M vinyl magnesium chloride in tetrahydrofuran. The Grignard solution was added over a period of 2–3 hours. Stirring was continued for an additioanl 2 hours at room temperature.

Dilute hydrochloric acid was then added to the reaction mixture followed by saturation with NaCl. The organic phase was separated and the aqueous layer extracted with ether. The organic layers were dried and distilled. The distillate, boiling point 70°±2° C./11 mm., obtained in 74% yield based on the Grignard, was a mixture of 4-hydroxy 5-chloro pentene-1 and 1,3-dichloro propanol-2. These may be separated if desired, but not necessarily, for the further reaction of forming the 1,4-pentadiene monoxide.

EXAMPLE 2

*1,4-pentadiene monoxide*

4-hydroxy 5-chloro pentene-1, 12 g., was suspended in 400 ml. of water. To the stirred suspension, 20 g. of 50% NaOH was added over a period of 0.25 hour. After this period, the reaction flask was subjected to a vacuum of 20 mm. Hg. The distillate was collected in a −76° C. bath. The bath contained $H_2O$ and an organic phase. The organic phase was separated, dried, and distilled. In this fashion, 1,4-pentadiene monoxide, boiling point 92–93° C., was obtained in 90% yield.

The 1,4-pentadiene monoxide monomer is polymerized satisfactorily at ordinary temperatures or at temperatures in the range of about −50° to 150° C. using various epoxide polymerization catalysts in the usual proportions of about 0.1 to 30% by weight of the monomer. The reaction mixture may be stirred during the period of polymerization. Results from various polymerization runs are set forth in the following table.

POLYMERIZATION OF PENTADIENE MONOXIDE

| Monomer | Catalyst | Temp., °C. | Time, Hrs. | Product |
|---|---|---|---|---|
| 1,4-pentadiene monoxide | PF₅-THF | 25 | 75 | Colorless liquid. |
| Do | PF₅-2-methyl THF | 25 | 42 | Colorless liquid, M.W. 990. |
| Do | PF₅ | 25 | 2 | Tan liquid, M.W. 1565. |
| 1,4-pentadiene monoxide+glycidol (9:1 molar ratio) | PF₅ | 25 | 2 | Colorless liquid, M.W. 1,490. |
| 1,4-pentadiene monoxide+water (9:1 molar ratio) | PF₅ | 25 | 75 | Colorless liquid, M.W. 854. |
| 1,4-pentadiene monoxide+ethylene glycol (9:1 molar ratio) | PF₅ | 25 | 75 | Colorless liquid, M.W. 529. |
| 1,4-pentadiene monoxide+trimethylolpropane (9:1 molar ratio) | PF₅ | 25 | 75 | Colorless liquid, M.W. 722. |
| 1,4-pentadiene monoxide | KOH, powdered | 100 | 75 | Yellow liquid. |
| Do | NaOCH₃ | 100 | 75 | Colorless liquid, M.W. 560. |

The polymers described in the table are unsaturated polyethers with the general structure:

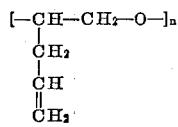

In the set forth recurring unit, the subscript "n" indicates that the recurring unit is present in the polymer molecule a variable number of times, usually from about 4 to 20 on the average depending on the molecular weight. This structure is amply indicated by the infrared and NMR spectra of the polymers. These polymers contain appreciable hydroxyl functionality, presumably as part or all of an end group. The hydroxyl functionality can be increased by polymerization in the presence of OH-containing modifiers, such as water, ethylene glycol, glycidol, glycerol, trimethylolpropane and pentaerythritol. Such polyethers find use in polyurethane formulations and as acrylate derivatives useful as synthetic elastomers and textile sizes, etc.

Addition reactions carried out with the polymer and reactants, such as halogen and nitrogen-containing reactants of low molecular weight, have proved that the desired unsaturation in the pendant chains attached to one of the carbon atoms in each of the recurring units is kept intact for forming adducts.

The invention described is claimed as follows:

1. Homopolymers of 1,4-pentadiene monoxide characterized by containing the recurring unit:

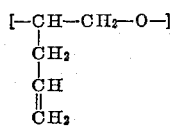

said homopolymers being further characterized by being liquids having molecular weights in the range of about 250 to 3000 and by having terminal OH groups.

2. The method of preparing homopolymers of 1,4-pentadiene monoxide which comprises polymerizing 1,4-pentadiene monoxide with an epoxide polymerization catalyst selected from the group consisting of PF₅, KOH and NaOCH₃ at a polymerization reaction temperature in the range of —50° C. to 150° C., and recovering a resulting homopolymer having the recurring unit:

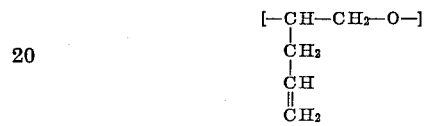

said homopolymers being liquids having molecular weights in the range of about 250 to 3000 and having terminal hydroxyl groups.

References Cited by the Examiner

UNITED STATES PATENTS

| | | | |
|---|---|---|---|
| 2,152,003 | 3/1939 | Van Peski et al. | 260—348 |
| 2,570,601 | 10/1951 | Schmerling | 260—2 |
| 2,594,452 | 4/1952 | Kosmin | 260—67.6 |
| 2,706,182 | 4/1955 | Pruitt | 260—2 |
| 2,783,250 | 2/1957 | Payne et al. | 260—348 |
| 2,786,067 | 3/1957 | Frostick et al. | 260—348 |
| 2,826,556 | 3/1958 | Greenspan et al. | 260—2 |
| 2,907,774 | 10/1959 | MacPeek | 260—348 |
| 3,065,213 | 11/1962 | Vandenberg | 260—88.3 |
| 3,107,253 | 10/1963 | Payne | 260—348 |
| 3,151,129 | 9/1964 | Leumann et al. | 260—348 |
| 3,158,591 | 11/1964 | Vandenberg | 260—88.3 |

OTHER REFERENCES

"Chemistry of Organic Compounds" (Noller) published by Saunders Company (Philadelphia, Pa.), 1951, pp. 689 and 690 relied upon.

Pudovik et al., C. A., vol. 51, 7309 (d, e), 1957.

Paquin, A. M., Epoxydverbindungen und Epoxydharze (1958), page 4.

JOSEPH L. SCHOFER, *Primary Examiner.*

LEON D. ROSDOL, CARL D. QUARFORTH, WALTER A. MODANCE, *Examiners.*

J. W. WHISLER, N. S. MILESTONE, H. WONG,
*Assistant Examiners.*